US007146501B2

(12) United States Patent
Tanaka

(10) Patent No.: US 7,146,501 B2
(45) Date of Patent: Dec. 5, 2006

(54) METHOD AND APPARATUS FOR ENCRYPTING AND DECRYPTING DATA USING ENCRYPTING KEY CONTAINED IN ELECTRONIC WATERMARK

(75) Inventor: Nobuyuki Tanaka, Tokyo (JP)

(73) Assignee: Nec Corporation, Tokyo (JP)

( * ) Notice: Subject to any disclaimer, the term of this patent is extended or adjusted under 35 U.S.C. 154(b) by 1068 days.

(21) Appl. No.: 10/057,521

(22) Filed: Jan. 24, 2002

(65) Prior Publication Data
US 2002/0108043 A1 Aug. 8, 2002

(30) Foreign Application Priority Data
Feb. 2, 2001 (JP) .............................. 2001-027207

(51) Int. Cl.
*H04N 7/167* (2006.01)
(52) U.S. Cl. ...................... 713/176; 713/168; 380/200; 352/1; 352/19; 352/26; 382/100
(58) Field of Classification Search ................ 713/168, 713/176; 380/200; 352/1, 19, 26; 382/100
See application file for complete search history.

(56) References Cited

U.S. PATENT DOCUMENTS

| | | | | |
|---|---|---|---|---|
| 5,613,004 A | * | 3/1997 | Cooperman et al. ........... | 380/28 |
| 5,991,426 A | * | 11/1999 | Cox et al. .................... | 382/100 |
| 6,011,849 A | * | 1/2000 | Orrin .......................... | 380/42 |
| 6,243,480 B1 | * | 6/2001 | Zhao et al. .................. | 382/100 |
| 6,301,663 B1 | * | 10/2001 | Kato et al. .................. | 713/176 |
| 6,353,672 B1 | * | 3/2002 | Rhoads ....................... | 382/100 |
| 6,519,352 B1 | * | 2/2003 | Rhoads ....................... | 382/100 |
| 6,523,113 B1 | * | 2/2003 | Wehrenberg ................ | 713/176 |
| 6,560,339 B1 | * | 5/2003 | Iwamura ..................... | 380/201 |
| 6,611,599 B1 | * | 8/2003 | Natarajan .................... | 380/203 |
| 6,674,874 B1 | * | 1/2004 | Yoshida et al. ............. | 382/100 |
| 6,804,377 B1 | * | 10/2004 | Reed et al. ................. | 382/100 |
| 6,865,550 B1 | * | 3/2005 | Cok ............................ | 705/51 |
| 6,954,854 B1 | * | 10/2005 | Miura et al. ................ | 713/168 |
| 6,957,350 B1 | * | 10/2005 | Demos ........................ | 360/60 |
| 2001/0004736 A1 | * | 6/2001 | Hirano et al. ................ | 705/51 |

(Continued)

FOREIGN PATENT DOCUMENTS

JP 10-164550 * 6/1998

(Continued)

OTHER PUBLICATIONS

Fang Bao, Multimedia Content Protection by Cryptography and Watermarking in Tamper-resistant Hardware, Proceedings of the 2000 ACM workshops on Multimedia Publisher, ACM Press, Nov. 2000.*

*Primary Examiner*—Taghi T. Arani
(74) *Attorney, Agent, or Firm*—Scully, Scott, Murphy & Presser, P.C.

(57) ABSTRACT

In encoder side, an electronic watermark generating device generates an electronic watermark which contains a encryption key. An electronic watermark inserting device inserts the electronic watermark containing the encryption key into a first portion of data. An encrypting device encrypts a second portion of the data with the encryption key. The first portion into which the watermark containing the encryption key has been inserted and the second portion which has been encrypted with the encryption key are combined by a switch and thereafter recorded on a record medium or transmitted to a network. In decoder side, the watermark containing the encryption key is extracted from the first portion and the encryption key is extracted from the watermark. The second portion is decrypted with the extracted encryption key.

43 Claims, 11 Drawing Sheets

U.S. PATENT DOCUMENTS

| | | | |
|---|---|---|---|
| 2002/0069359 A1* | 6/2002 | Watanabe | 713/176 |
| 2002/0150239 A1* | 10/2002 | Carny et al. | 380/37 |
| 2003/0009669 A1* | 1/2003 | White et al. | 713/176 |
| 2003/0023847 A1* | 1/2003 | Ishibashi et al. | 713/169 |
| 2003/0194109 A1* | 10/2003 | Acharya et al. | 382/100 |
| 2004/0264735 A1* | 12/2004 | Rhoads | 382/100 |
| 2005/0039022 A1* | 2/2005 | Venkatesan et al. | 713/176 |

FOREIGN PATENT DOCUMENTS

| | | |
|---|---|---|
| JP | 11-232779 | 8/1999 |
| JP | 11-317859 | 11/1999 |

* cited by examiner

METHOD AND APPARATUS FOR ENCRYPTING AND DECRYPTING DATA USING ENCRYPTING KEY CONTAINED IN ELECTRONIC WATERMARK

BACKGROUND OF THE INVENTION

1. Field of the Invention

The present invention relates to a method and apparatus for inserting an electronic watermark into digital data and a method and apparatus for detecting the electronic watermark from the digital data and in particular, to a method and apparatus for inserting an electronic watermark into digital video data and a method and apparatus for detecting the electronic watermark from the digital video data.

In addition, the present invention relates to a method and apparatus for encrypting digital data and a method and apparatus for decrypting the encrypted digital data and in particular, to a method and apparatus for encrypting digital video data and a method and apparatus for decrypting the encrypted digital video data.

2. Description of the Prior Art

In recent years, video data and audio data are digitized before being stored, transmitted, and distributed. Along with popularization of digitizing data, a problem that digital data are illegally copied arises. Technologies for inserting an electronic watermark into digital data and detecting the electronic watermark from the digital data are attracting attention as technologies for preventing the digital data from being illegally copied. Such technologies are being developed so that they can be commercially used. As a technology for preventing data and programs from being falsified, an encrypting system is known, beside the electronic watermark. In the encrypting system, data or a program is encrypted with a particular encryption key. Without the encryption key, the data or the program cannot be used.

However, such an encrypting technology has a drawback that once an encryption key is stolen, encrypted data can be easily decrypted. In the CSS (Contents Scrambling System) applied for a DVD (Digital Versatile disk), all the contents of DVDs are encrypted with an identical encryption key (a single encryption key or one set of encryption keys). Therefore, once the encryption key or the set of encryption keys is stolen, all the contents of the DVDs can be decrypted, whereby they can be illegally copied.

If each content is encrypted with a unique encryption key, the problem involved in the CSS can be solved. However, if respective encryption keys of contents of DVDs are supplied to a buyer of the contents in a different route from the route of the contents, the buyer has to set the respective encryption keys for each contents to a reproducing apparatus or a reproducing computer software. Thus, the buyer is obliged to perform a troublesome operation. Alternatively, if an encryption key is inserted into a particular area of MPEG (Moving Picture Experts Group) data, an illegal person can easily extract the encryption key from the MPEG data, decrypt the encrypted MPEG data with the extracted encryption key, and make a copy of the decrypted MPEG data.

JPA 11-317859 discloses a technology for inserting an electronic watermark into video data, scrambling the video data in block units while using the electronic watermark as a part of data for coordinate transformation in the scrambling the video data. In such a technology, the scrambled video data can be descrambled only when a reproduction side has the same electronic watermark as the electronic watermark inserted into the video data. However, in this technology, video data are not encrypted, though the video data is scrambled in block units. Thus, without need to descramble the scrambled video data, the electronic watermark can be detected from any frame. Consequently, in this technology, the electronic watermark cannot be concealed at all. In addition, since the video data have been scrambled in block units, there is no spatial continuity in the vide data. Thus, when the video data is to be compressed, a motion vector for each block cannot be detected. As a result, the motion-compensated inter-frame predictive encoding cannot be performed, whereby the video data cannot be highly efficiently compressed.

SUMMARY OF THE INVENTION

The present invention has been made to overcome the aforementioned disadvantages. An object of the present invention is to provide a method and apparatus for encrypting and decrypting data using encrypting key contained in electronic watermark which more securely restrict the reproduction of digital contents, using features of an electronic watermark technology and an encrypting technology.

According to a first aspect of the present invention, there is provided an encrypting apparatus using an encryption key contained in an electronic watermark, the apparatus comprising: generating means for generating a first electronic watermark that contains a first encryption key; electronic watermark inserting means for inserting the first electronic watermark containing the first encryption key into a first portion of data; and encrypting means for encrypting a second portion of the data with the first encryption key.

In the encrypting apparatus, the electronic watermark generating means may generate a second electronic watermark that contains a second encryption key, the electronic watermark inserting means may insert the second electronic watermark into the second portion before the encrypting means encrypts the second portion with the first encryption key, and the encrypting means may encrypt a third portion of the data with the second encryption key.

In the encrypting apparatus, the electronic watermark generating means may generate an n-th electronic watermark that contains an n-th encryption key, where n is an integer larger than one, the electronic watermark inserting means may insert the n-th electronic watermark into n-th portion of the data before the encrypting means encrypts the n-th portion with an (n−1)-th encryption key, and the encrypting means may encrypt an (n+1)-th portion of the data with the n-th encryption key.

The encrypting apparatus, may further comprise: compressing means for compressing the data.

In the encrypting apparatus, the compressing means may compresses the data before the data is encrypted.

In the encrypting apparatus, the data may contain at least one of video data, audio data, and character data.

In the encrypting apparatus, the first portion and the second portion may be output to a same medium.

In the encrypting apparatus, the second portion may be output to a medium different from a medium to which the first portion is output.

In the encrypting apparatus, the first portion may contain a commercial.

According to a second aspect of the present invention, there is provided a decrypting apparatus using an encryption key contained in an electronic watermark, the apparatus comprising: electronic watermark detecting means for detecting a first electronic watermark from a first portion of data; encryption key extracting means for extracting a first encryption key from the first electronic watermark; and decrypting means for decrypting a second portion of the data with the first encryption key.

In the decrypting apparatus, the electronic watermark detecting means may detect a second electronic watermark from the second portion decrypted with the first encryption key by the decrypting means, the encryption key extracting means may extract a second encryption key from the second electronic watermark, and the decrypting means may decrypt a third portion of the data with the second encryption key.

In the decrypting apparatus, the electronic watermark detecting means may detect an n-th electronic watermark from an n-th portion of the data decrypted with an (n−1)-th encryption key by the decrypting means, where n is an integer larger than one, the encryption key extracting means may extract an n-th encryption key from the n-th electronic watermark, and the decrypting means may decrypt an (n+1)-th portion of the data with the n-th encryption key.

The decrypting apparatus may further comprise: expanding means for expanding the data.

In the decrypting apparatus, the expanding means may expand the data after the data is decrypted.

In the decrypting apparatus, the data may contain at least one of video data, audio data, and character data.

In the decrypting apparatus, the first portion and the second portion may be input from a same medium.

In the decrypting apparatus, the second portion may be input from a medium different from a medium from which the first portion is input.

In the decrypting apparatus, the first portion may contain a commercial.

According to a third aspect of the present invention, there is provided a computer readable record medium on which data has been recorded, the data comprising: a first portion into which a first electronic watermark that contains a first encryption key has been inserted; and a second portion encrypted with the first encryption key.

In the computer readable record medium, a second electronic watermark that contains a second encryption key may have been inserted into the second portion, and the data may have a third portion encrypted with the second encryption key.

In the computer readable record medium, an n-th (where n is an integer larger than one) electronic watermark that contains an n-th encryption key may have been inserted into an n-th portion; and the data may have an (n+1)-th portion encrypted with the n-th encryption key.

These and other objects, features and advantages of the present invention will become more apparent in light of the following detailed description of a best mode embodiment thereof, as illustrated in the accompanying drawings.

DESCRIPTION OF PREFERRED EMBODIMENTS

Next, with reference to the accompanying drawings, embodiments of the present invention will be described.

(First Embodiment)

Figure 1:
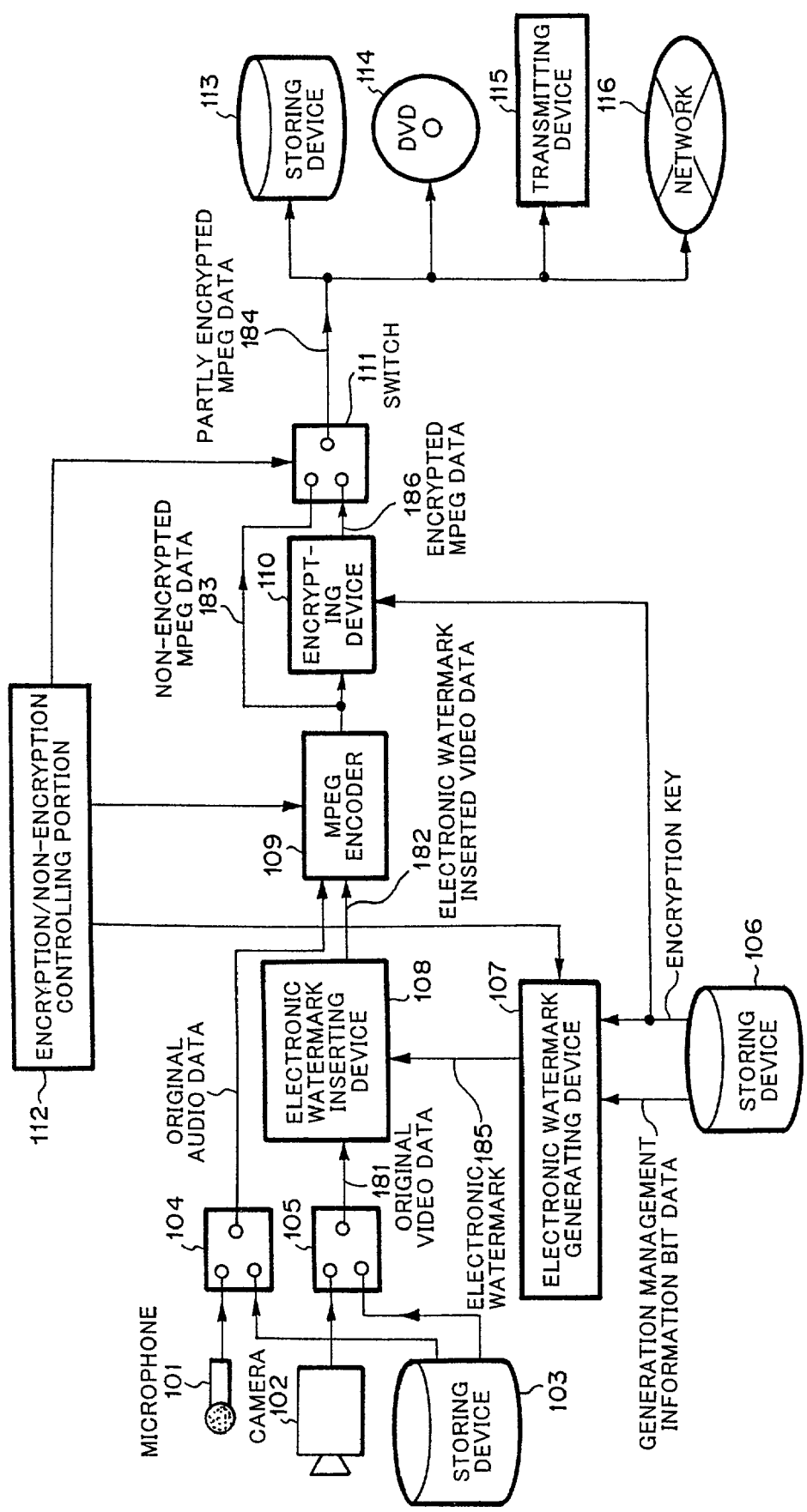
FIG. 1 is a block diagram showing the structure of an audio data and video data encoding apparatus and peripheral portions thereof according to embodiments of the present invention.

FIG. 1 is a block diagram showing the structure of an audio data and video data encoding apparatus and peripheral portions thereof according to the first embodiment of the present invention.

Referring to FIG. 1, reference numeral 101 represents a microphone that converts a voice or sound into original audio data. Reference numeral 102 represents a camera that converts a picture into original video data. Reference numeral 103 represents a storing device 103 that stores original audio data and original video data. Reference numeral 104 represents a switch 104 that selects the original audio data that is input from the microphone 101 or the original audio data that is stored in the storing device 103. Reference numeral 105 represents a switch that selects the original video data that is input from the camera 102 or the original video data stored in the storing device 103 and outputs selected original video data 181.

Reference numeral 106 represents a storing device that stores generation management information bit data and an encryption key. Reference numeral 107 represents an electronic watermark generating device that generates an electronic watermark on the basis of the generation management information bit data and the encryption key. The electronic watermark contains the generation management information bit data and the encryption key. Reference numeral 108 is an electronic watermark inserting device that inserts an electronic watermark 185 generated by the electronic watermark generating device 107 into the original video data that is input from the switch 105 and generates electronic watermark inserted video data 182.

Reference numeral 109 is an MPEG encoder 109 that compresses the original audio data that is input from the switch 104 and the electronic watermark inserted video data 182 that is input from the electronic watermark inserting device 108 and generates non-encrypted MPEG data 183. Reference numeral 110 is an encrypting device that encrypts the non-encrypted MPEG data 183 that is input from the MPEG encoder 109 with the encryption key that is input from the storing device 106 and generates encrypted MPEG data 186. Reference numeral 111 represents a switch that selects the non-encrypted MPEG data 183 that is input from the MPEG encoder 109 or the encrypted MPEG data 186 that is input from the encrypting device 110 and outputs partly encrypted MPEG data 184.

The encrypting process performed by the encrypting device 110 is based on, for example, DES (Data Encryption Standard). Thus, the encryption key is a common key.

Reference numeral 112 represents an encryption/non-encryption controlling portion that controls whether or not the encrypting process is performed at each time. The encryption/non-encryption controlling portion 112 outputs control signals to the electronic watermark generating device 107, the MPEG encoder 109, and the switch 111.

Partly encrypted MPEG data 184 that is output from the switch 111 is stored to a storing device 113, recorded on a DVD 114, transmitted from a transmitting device 115, or transmitted to a network 116. The transmitting device 115 may be a transmitting device paired with a receiving device, and also may be a broadcasting transmitting device.

Figure 2:
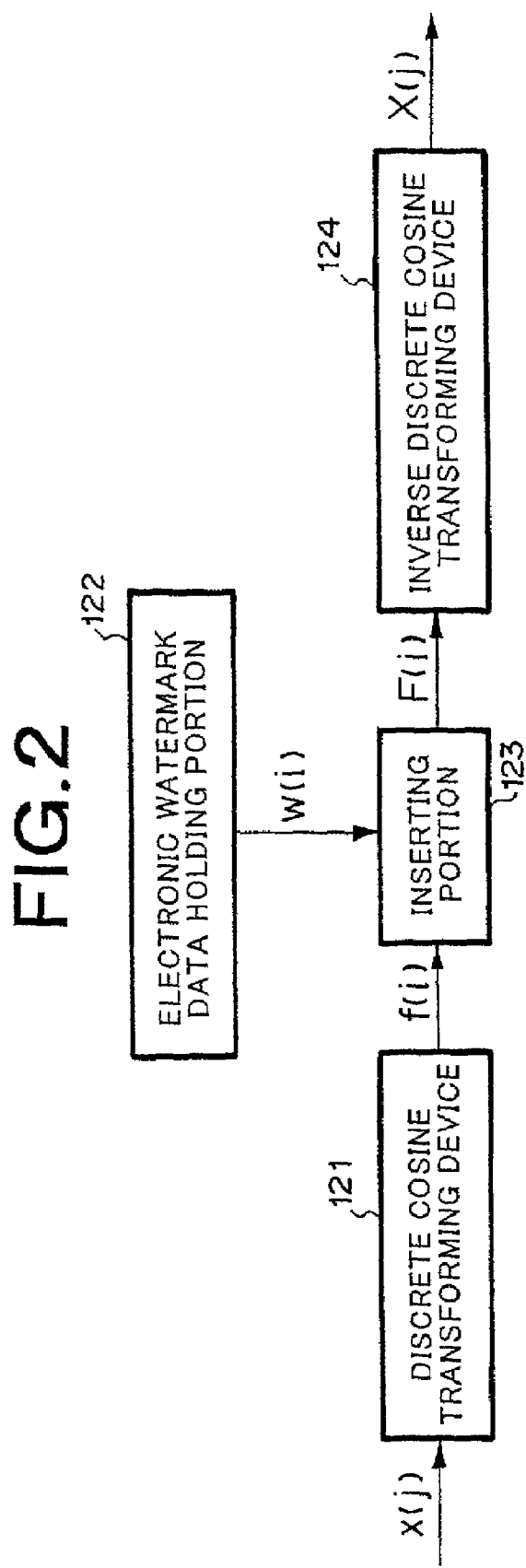
FIG. 2 is a block diagram showing the structure of an example of an electronic watermark inserting device shown in FIG. 1.

FIG. 2 is a block diagram showing the structure of the electronic watermark inserting device 108 shown in FIG. 1.

Referring to FIG. 2, the electronic watermark inserting device 108 comprises a discrete cosine transforming device 121, an electronic watermark data holding portion 122, an inserting portion 123, and an inverse discrete cosine transforming device 124.

The discrete cosine transforming device 121 performs a two-dimensional discrete cosine transforming process for 8×8 pixels x(j) in the original video data in a spatial region and outputs coefficients f(i) in a frequency region, where j represents a pixel number after two-dimensional data has been rearranged in one-dimensional data and i represents a coefficient number after two-dimensional data has been arranged in one-dimensional data.

The electronic watermark data holding portion 122 holds electronic watermark data w(1), w(2), . . . , and w(n). The electronic watermark data complies with a normal distribution whose average is zero and whose dispersion is one.

The inserting portion 123 calculates a coefficient F(i) into which an electronic watermark has been inserted on the basis of the coefficients f(i) and the electronic watermark data w(i) using the following formula.

$$F(i)=f(i)+\alpha \times avg(f(i)) \times w(i)$$

where α represents a scaling factor; and avg(f(i)) represents a partial average, which is the average of absolute values of three adjacent points of f(i). Thereafter, the inserting portion 123 outputs F(i).

The inverse discrete cosine transforming device 124 performs an inverse discrete cosine transforming process for the coefficients F(i) into which the electronic watermark has been inserted and outputs electronic watermark inserted video data X(j) in the spatial region.

Figure 3:
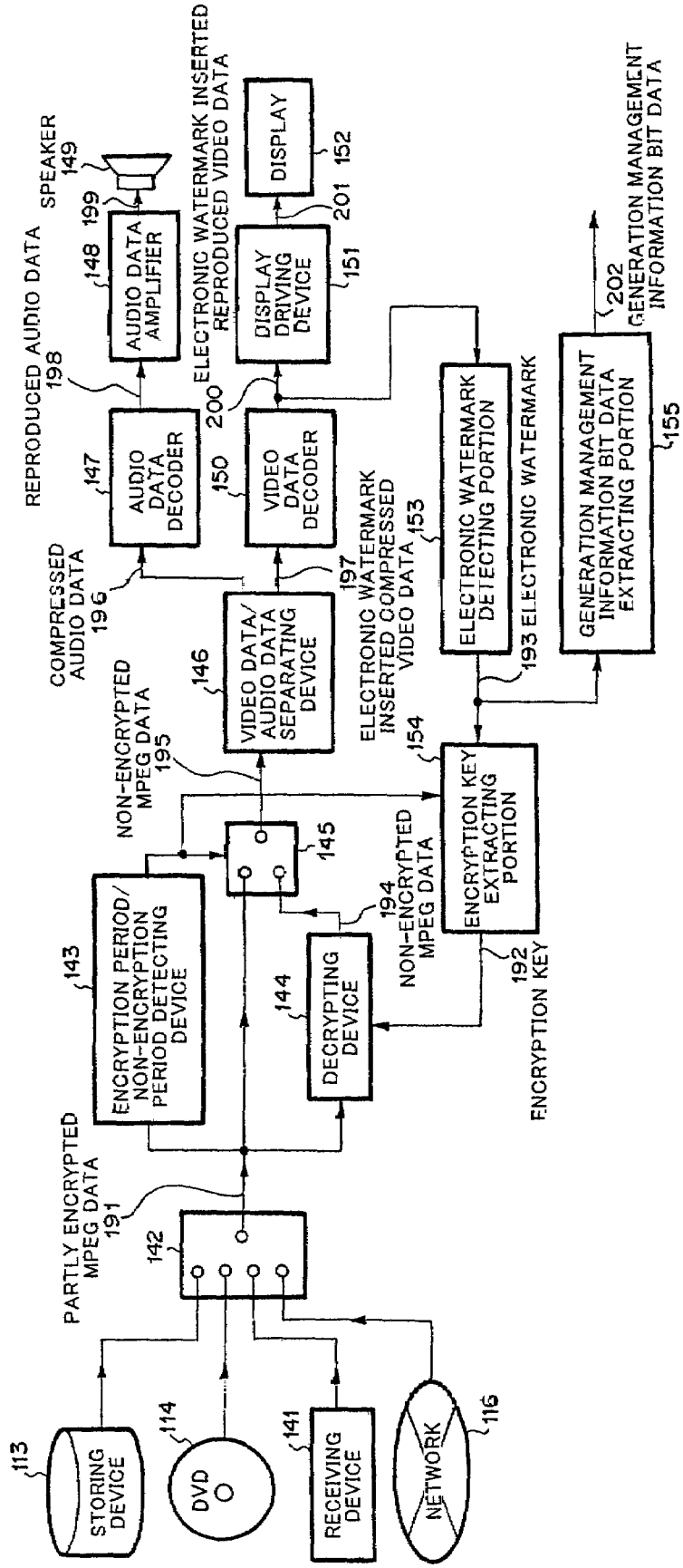
FIG. 3 is a block diagram showing the structure of an audio data and video data decoding apparatus and peripheral portions thereof according to the embodiments of the present invention.

FIG. 3 is a block diagram showing the structure of an audio data and video data decoding apparatus and peripheral portions thereof according to the first embodiment of the present invention.

Referring to FIG. 3, reference numeral 141 represents a receiving device that receives partly encrypted MPEG data that is transmitted from the transmitting device 115. The receiving device 141 may be a receiving device paired with a transmitting device, and also may be a receiving device that receives a broadcast transmitted from a broadcasting station.

Reference numeral 142 represents a switch 142 that selects partly encrypted MPEG data from the storing device 113, the DVD 114, the receiving device 141, or the network 116.

Reference numeral 143 represents an encryption period/non-encryption period detecting portion 143 that inputs partly encrypted MPEG data 191 and detects whether or not the input MPEG data 191 has been encrypted at each time. Reference numeral 144 represents a decrypting device that inputs partly encrypted MPEG data 191 and decrypts it using an encryption key 192 extracted from an electronic watermark 193 by an encryption key extracting portion 154. Reference numeral 145 represents a switch that selects partly encrypted MPEG data 191 in the non-encryption period or non-encrypted MPEG data 194 that is input from the decrypting device 144 in the encryption period on the basis of an encryption period/non-encryption period detection signal 195 that is input from the encryption period/non-encryption period detecting portion 143. When the switch 145 selects the partly encrypted MPEG data 191 in the non-encryption period, the partly encrypted MPEG data 191 has not been encrypted.

Reference numeral 146 represents a video data/audio data separating device that inputs non-encrypted MPEG data 195, separates it into compressed audio data 196 and electronic watermark inserted compressed video data 197, and outputs them. Reference numeral 147 represents an audio data decoder that expands compressed audio data 196 to reproduced audio data 198. Reference numeral 148 represents an audio amplifier that amplifies the reproduced audio data 198 and generates a speaker drive signal 199. Reference numeral 149 represents a speaker that outputs a voice or sound on the basis of the speaker drive signal 199.

Reference numeral 150 represents video data decoder 150 that expands the electronic watermark inserted compressed video data 197 to electronic watermark inserted reproduced video data 200. Reference numeral 151 represents a display driving device that generates a display drive signal 201 on the basis of the electronic watermark inserted reproduced video data 200. Reference numeral 152 represents a display that displays a picture on the basis of the display drive signal 201.

Reference numeral 153 represents an electronic watermark detecting portion that detects an electronic watermark from the electronic watermark inserted reproduced video data 200 and outputs the detected electronic watermark 193 to the encryption key extracting portion 154. Reference numeral 154 represents an encryption key extracting portion that extracts an encryption key 192 from the electronic watermark 193 and outputs the extracted encryption key 192. Reference numeral 155 represents a generation management information bit data extracting portion that extracts generation management information bit data 202 from the electronic watermark 193 and outputs the extracted generation management information bit data 202.

The generation management information bit data 202 is composed of two bits that represent copy unlimited, copy once, or inhibit. The generation management information bit data 202 is used in combination with a copy mark and medium type information so as to prohibit a reproducing operation or a copying operation. However, since the generation management information bit data 202 is out of the scope of the present invention, the description thereof is omitted.

Figure 4:
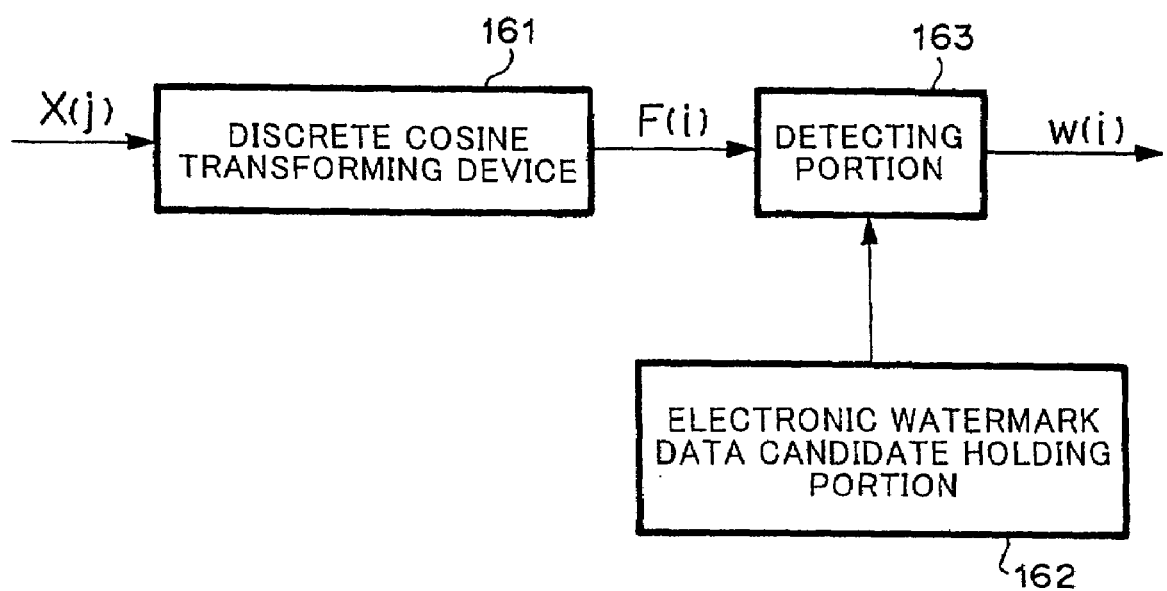
FIG. 4 is a block diagram showing the structure of an example of an electronic watermark detecting device shown in FIG. 3.

FIG. 4 is a block diagram showing the structure of the electronic watermark detecting portion 153 shown in FIG. 3.

Referring to FIG. 4, the electronic watermark detecting portion 153 comprises a discrete cosine transforming device 161, an electronic watermark candidate holding portion 162, and a detecting portion 163.

The discrete cosine transforming device 161 performs a discrete cosine transforming process for electronic watermark inserted video data X(j) in a spatial region and outputs coefficients F(i) into which an electronic watermark has been inserted.

The electronic watermark data candidate holding portion 162 holds a plurality of candidates of electronic watermark.

The detecting portion 163 calculates the electronic watermark data W(i) on the basis of the coefficients F(i) into which the electronic watermark has been inserted using the following formula, and obtains the sum WF(i) of W(i) in one frame for each i.

$$W(i)=F(i)/\mathrm{avg}(F(i))$$

Next, the detecting portion 163 calculates the statistic similarity C of the electronic watermark candidate w(i) and WF(i) with an inner product of a vector using the following formula.

$$C=WF \times w/(WFD \times wD)$$

where WF=(WF(1), WF(2), ..., WF(n)),
w=(w (1), w (2), ..., w (n)),
WFD=absolute value of vector WF
wD=absolute value of vector w When the statistic similarity C is equal to or larger than a predetermined value, it is determined that the concerned electronic watermark has been inserted.

Figure 5:
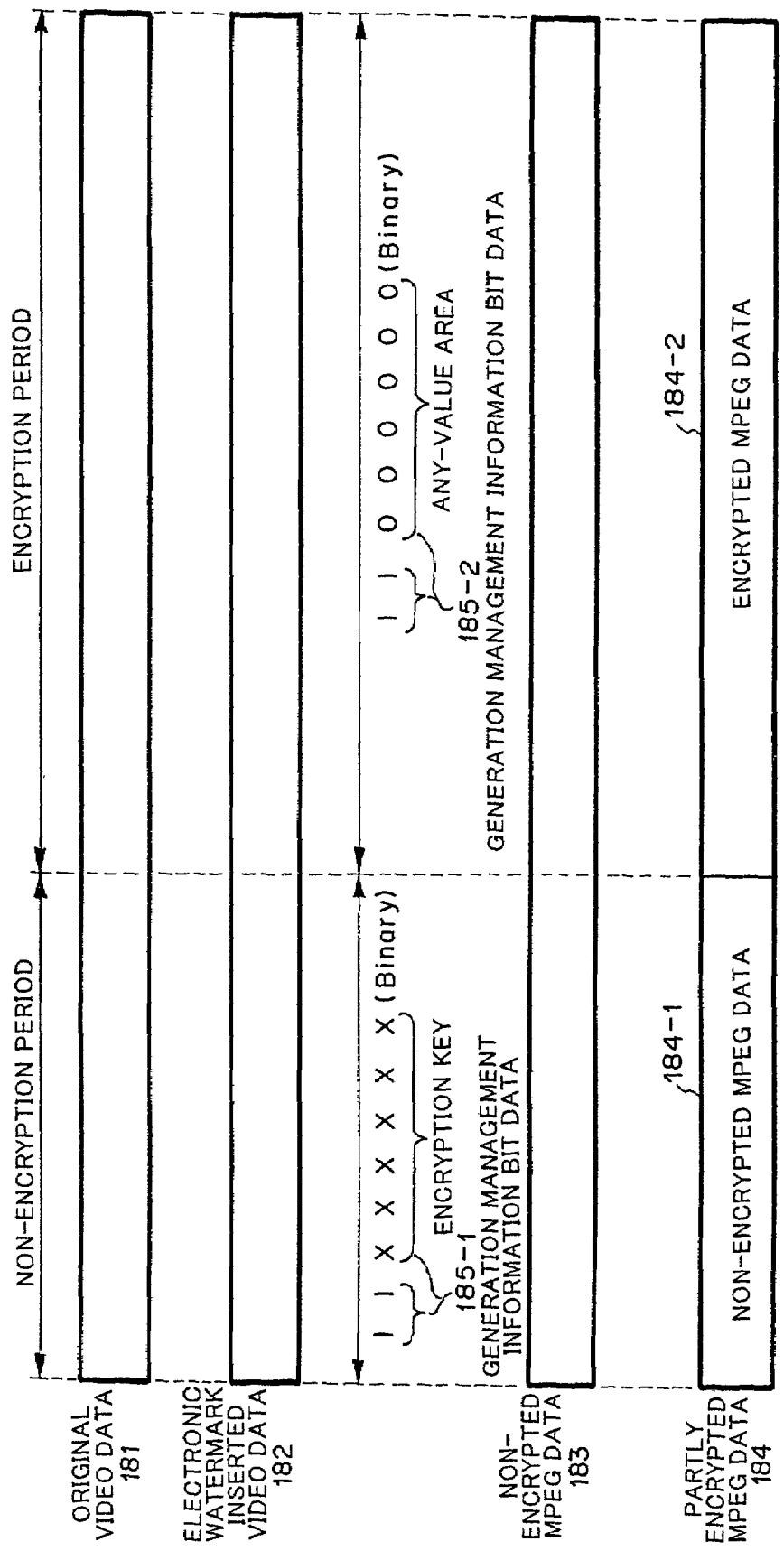
FIG. 5 is a schematic diagram showing data that is input and output to and from principal portions of the audio data and video data encoding apparatus according to a first embodiment of the present invention.

FIG. 5 is a schematic diagram showing signals that are output from each portion of the audio data and video data encoding apparatus according to the first embodiment of the present invention. FIG. 5 shows original video data 181 that is output from the switch 105, electronic watermark inserted video data 182 that is output from the electronic watermark inserting device 108, non-encrypted MPEG data 183 that is output from the MPEG encoder 109, and partly encrypted MPEG data 184 that is output from the switch 111.

Referring to FIG. 5, the electronic watermark 185 inserted into the electronic watermark inserted video data 182 is composed of eight bits. As denoted by reference numeral 185-1, in the non-encryption period, the electronic watermark 185 is composed of generation management information bit data of two bits and an encryption key of six bits. As denoted by reference numeral 185-2, in the encryption period, the electronic watermark 185 is composed of generation management information bit data of two bits and an any-value area of six bits. In the example shown in FIG. 5, the generation management information bit data is "11 (binary)" that represents a copy inhibit.

Although only an encryption key of six bits can be inserted into one electronic watermark, if an encryption key is divided and inserted into a plurality of electronic watermarks, an encryption key of more than six bits can be inserted into video data. Since one electronic watermark can be inserted, for example, every 15 frames of the NTSC system, an encryption key composed of 24 bits can be inserted into video data of around two seconds. However, in consideration of the quality of vide data into which an electronic watermark has been inserted, an encryption key of 24 bits may be inserted in vide data of longer than two seconds.

The partly encrypted MPEG data 184 is not encrypted in the non-encryption period as denoted by reference numeral 184-1, whereas the partly encrypted MPEG data 184 is encrypted in the encryption period as denoted by reference numeral 184-2.

Each of encryption period and the non-encryption period may be assigned to MPEG data in file units or sequence units. However, if a flag that represents the encryption period/non-encryption period is inserted into a private packet of MPEG data or if the non-encryption period is a fixed time period, the encryption period and the non-encryption period may be assigned to MPEG data in shorter or longer units than file units or sequence units.

Figure 6:
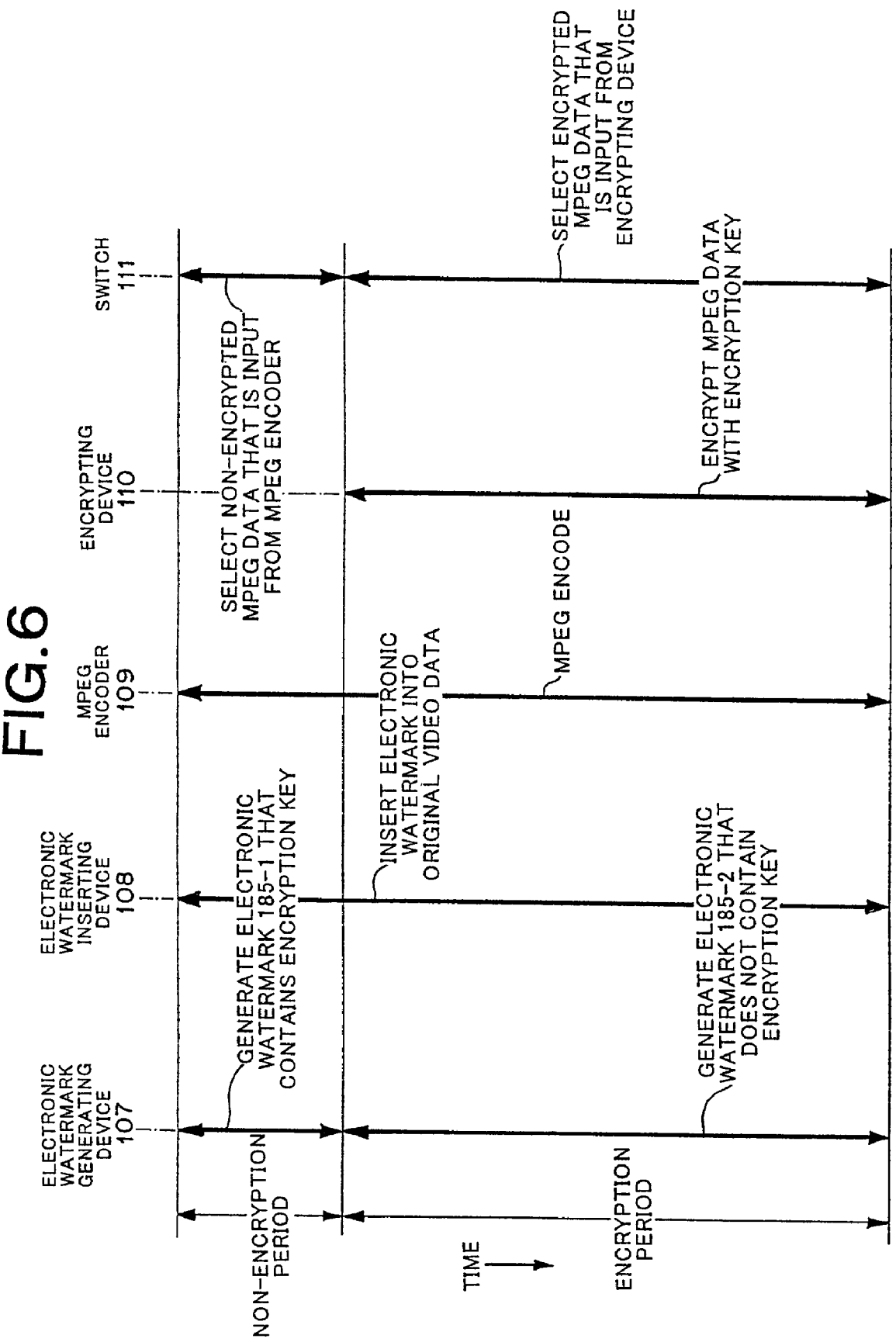
FIG. 6 is a timing chart showing the operations of the principal portions of the audio data and video data encoding apparatus according to the first embodiment of the present invention.

FIG. 6 is a timing chart showing operations of the principal portions of the audio data and video data encoding apparatus according to the first embodiment of the present invention.

Referring to FIG. 6, in the non-encryption period, the electronic watermark generating device 107 generates an electronic watermark 185-1 that contains an encryption key. The electronic watermark inserting device 108 inserts the electronic watermark 185-1 into original video data 181. The MPEG encoder 109 MPEG encodes electronic watermark inserted video data 182. The switch 111 selects non-encrypted MPEG data 183 that is input from the MPEG encoder 109. In the non-encryption period, the encrypting device 110 does not encrypt non-encrypted MPEG data 183.

In the encryption period, the electronic watermark generating device 107 generates an electronic watermark 185-2 that does not contain an encryption key. The electronic watermark inserting device 108 inserts the electronic watermark 185-2 into original video data 181. The MPEG encoder 109 MPEG encodes electronic watermark inserted video data 182. In the non-encryption period, the encrypting device 110 encrypts non-encrypted MPEG data 183 with the encryption key contained in the electronic watermark 185-1. The switch 111 selects encrypted MPEG data 186.

Figure 7:
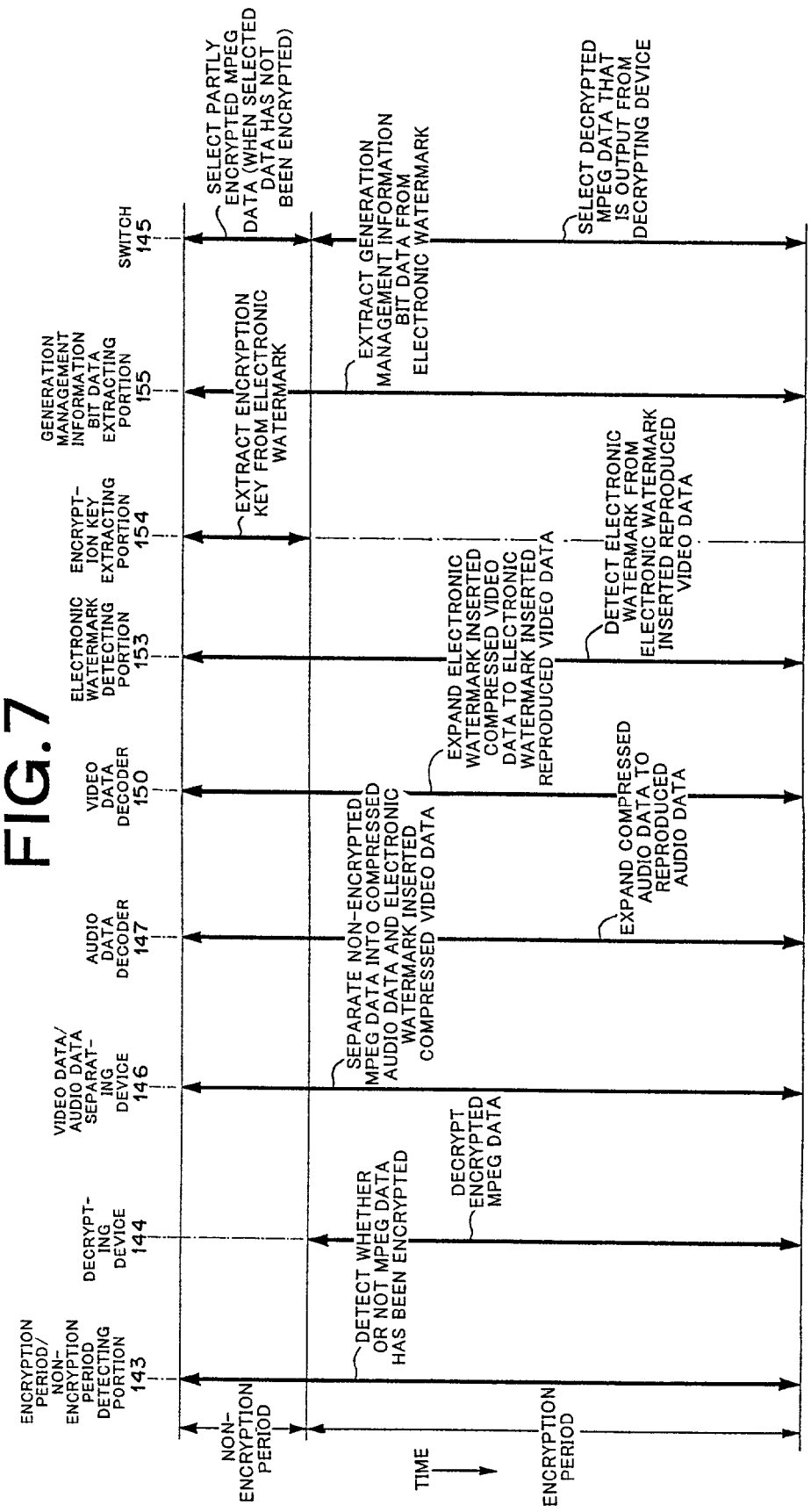
FIG. 7 is a timing chart showing the operations of the principal portions of the audio data and video data decoding apparatus according to the first embodiment of the present invention.

FIG. 7 is a timing chart showing operations of the principal portions of the audio data and video data decoding apparatus according to the first embodiment of the present invention.

Referring to FIG. 7, in the non-encryption period, the encryption period/non-encryption period detecting portion 143 detects whether partly encrypted MPEG data 191 has been encrypted. A method for detection depends on whether the encryption period and the non-encryption period have been assigned to MPEG data in file units, the encryption period and the non-encryption period have been assigned to MPEG data in sequence units, the flag that represents whether the encryption period/non-encryption period has been inserted into the private packet of the MPEG data, or the non-encryption period is a fixed time period.

In the non-encryption period, the video data/audio data separating device 146 separates non-encrypted MPEG data 195 into compressed audio data 196 and electronic watermark inserted compressed video data 197. The audio data decoder 147 expands the compressed audio data 196 to reproduced audio data 198. The video data decoder 150 expands the electronic watermark inserted compressed video data 197 to electronic watermark inserted reproduced video data 200. The electronic watermark detecting portion 153 detects an electronic watermark 193 that contains generation management information bit data and an encryption key from the electronic watermark inserted reproduced video data 200. The encryption key extracting portion 154 extracts the encryption key 192 from the electronic watermark 193. The generation management information bit data extracting portion 155 extracts the generation management information bit data 202 from the electronic watermark 193. The switch 145 selects the partly encrypted MPEG data 191, which is also input to the decrypting device 144. In the non-encryption period, the partly encrypted MPEG data 191 has not been encrypted.

In the non-encryption period, the decrypting device 144 does not performs decryption.

In the encryption period, the encryption period/non-encryption period detecting portion 143 detects whether or not partly encrypted MPEG data 191 has been encrypted. The decrypting device 144 decrypts encrypted MPEG data 191-1 with the encryption key 192 extracted from the electronic watermark 193 by the encryption key extracting portion 154 in the non-encryption period. The video data/audio data separating device 146 separates non-encrypted MPEG data 195 into compressed audio data 196 and electronic watermark inserted compressed video data 197. The audio data decoder 147 expands the compressed audio data 196 to reproduced audio data 198. The video data decoder 150 expands the electronic watermark inserted compressed video data 197 to electronic watermark inserted reproduced video data 200. The electronic watermark detecting portion 153 detects an electronic watermark 193 that contains generation management information bit data from the electronic watermark inserted reproduced video data 200. The generation management information bit data extracting portion 155 extracts the generation management information bit data 202 from the electronic watermark 193. The switch 145 selects the non-encrypted MPEG data 194 that is output from the decrypting device 144.

In the encryption period, the encryption key extracting portion 154 does not extract an encryption key from the electronic watermark 193.

According to the first embodiment, the following effects can be obtained.

Even if an encryption key for a certain content is cryptanalized, other contents cannot be decrypted with the cryptanalized encryption key. Thus, the copyright of a contents producer can be properly protected. In a case where one content is divided into a plurality of portions and then the first embodiment is applied to each portion, even if an encryption key for one divided portion is cryptanalyzed, other divided portions cannot be decrypted with the cryptanalyzed encryption key. Thus, the copyright of the content producer can be more properly protected.

Since an encryption key is contained in a content, it is not necessary for the user to obtain the encryption key and the content in different routes and set the obtained encryption key to the reproducing device.

Since an intact encryption key has not been inserted into MPEG data, it is difficult to extract the encryption key from the MPEG data. In particular, if the reproducing device has a structure that prevents an encryption key that is output from the encryption key extracting portion 154 from being accessed from the outside of the device, it becomes impossible for an unauthorized person to extract the encryption key from the MPEG data.

Since the reproducing device cannot reproduce audio data and video data unless the device is provided with an electronic watermark detecting device, a pirate reproducing device that does not have the electronic watermark detecting device cannot reproduce audio data and video data.

Without reproducing video data into which an electronic watermark containing an encryption key has been inserted, encrypted video data cannot be decrypted. Thus, for example, if an electronic watermark containing an encryption key is inserted into a commercial, an audience always watch the commercial before watching the content. Consequently, the content producer can obtain a profit from the sponsor.

(Second Embodiment)

According to a second embodiment of the present invention, a second encryption key is contained in an electronic watermark in a first encryption period of MPEG data which has been encrypted with a first encryption key. Another period of the MPEG data is encrypted with the second encryption key. In other words, one encryption period is divided into a plurality of encryption subperiods. MPEG data in each encryption subperiod is encrypted with an encryption key contained in an electronic watermark contained in another encryption subperiod.

Since the structure of an audio data and video data encoding apparatus according to the second embodiment is the same as the structure of the audio data and video data encoding apparatus according to the first embodiment shown in FIG. 1, the description thereof will be omitted. In addition, the structure of an audio data and video data decoding apparatus according to the second embodiment is the same as the structure of the audio data and video data decoding apparatus according to the first embodiment shown in FIG. 3, the description thereof will be also omitted.

Figure 8:
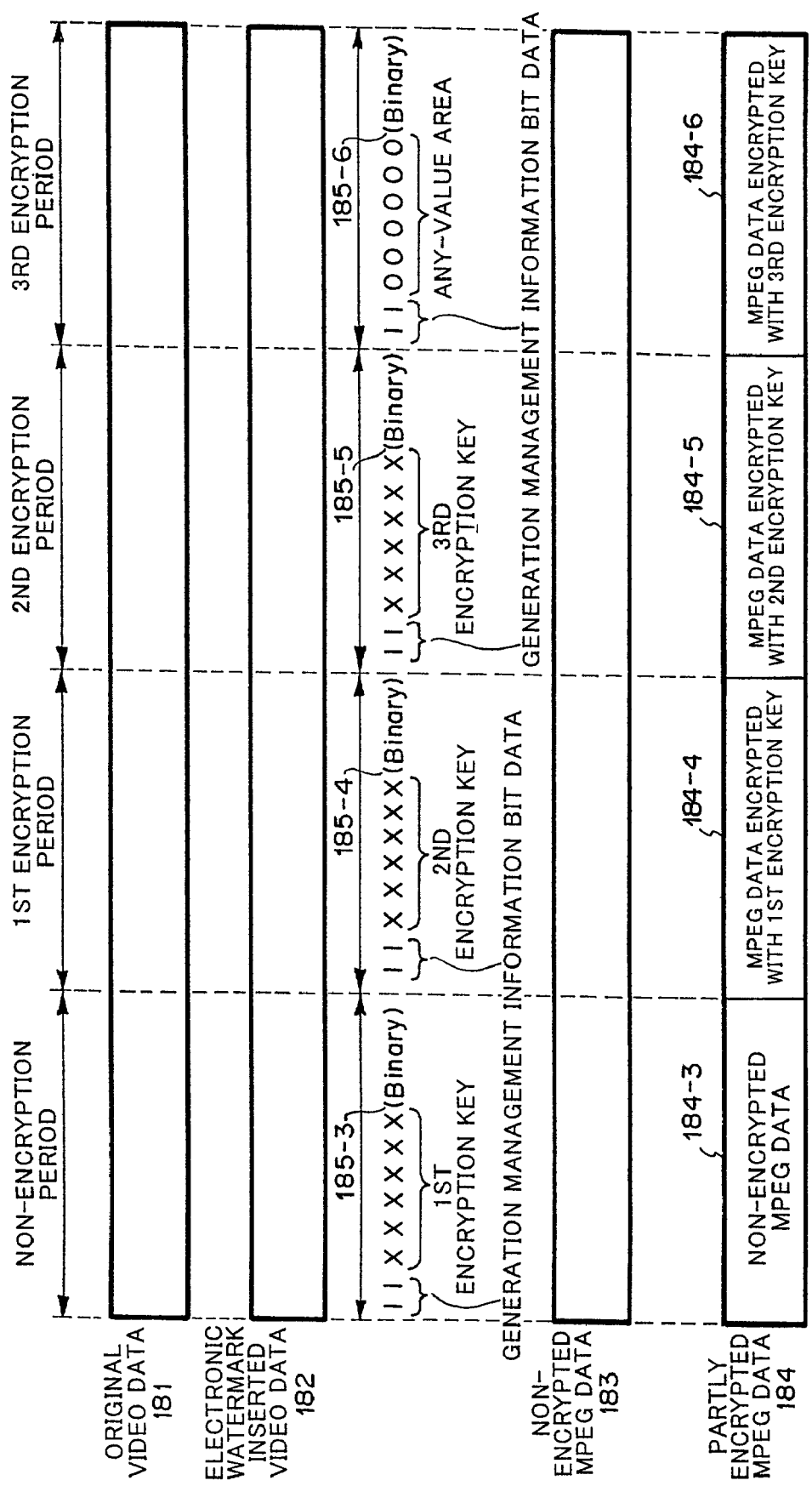
FIG. 8 is a schematic diagram showing data that is input and output to and from principal portions of an audio data and video data encoding apparatus according to a second embodiment of the present invention.

FIG. 8 is a schematic diagram showing signals that are output from individual portions of the audio data and video data encoding apparatus according to the second embodiment of the present invention. FIG. 8 shows original video data 181 that is output from the switch 105, electronic watermark inserted video data 182 that is output from the electronic watermark inserting device 108, non-encrypted MPEG data 183 that is output from the MPEG encoder 109, and partly encrypted MPEG data 184 that is output from the switch 111.

Referring to FIG. 8, an electronic watermark 185 inserted into the electronic watermark inserted video data 182 is composed of eight bits. As denoted by reference numeral 185-3, in the non-encryption period, the electronic watermark 185 is composed of generation management information bit data of two bits and a first encryption key of six bits. As denoted by reference numeral 185-4, in the encryption period with a first encryption key, the electronic watermark 185 is composed of generation management information bit data of two bits and a second encryption key of six bits. As denoted by reference numeral 185-5, in the encryption period with the second encryption key, the electronic watermark 185 is composed of generation management information bit data of two bits and a third encryption key of six bits. As denoted by reference numeral 185-6, in the encryption period with the third encryption key, the electronic watermark 185 is composed of generation management information bit data of two bits and an any-value area of six bits. In the example shown in FIG. 8, the generation management information bit data is "11 (binary)" that represents a copy inhibit, similar to the example shown in FIG. 5.

As denoted by reference numeral 184-3, in the non-encryption period, the partly encrypted MPEG data 184 is not encrypted. As denoted by reference numeral 184-4, in the encryption period with the first encryption key (first encryption period), the partly encrypted MPEG data 184 is encrypted with the first encryption key. As denoted by the reference numeral 184-5, in the encryption period with the second encryption key (second encryption period), the partly encrypted MPEG data 184 is encrypted with the second encryption key. As denoted by reference numeral 184-6, in the encryption period with third encryption key (third encryption period), the partly encrypted MPEG data 184 is encrypted with the third encryption key.

The first to third encryption periods and the non-encryption period may be assigned to MPEG data in file units or sequence units. Alternatively, flags that represent the first to third encryption periods and the non-encryption period may be inserted in a private packet of MPEG data. Further, the first to third encryption periods and the non-encryption period may be fixed periods. In the alternative cases, the first to third encryption periods and the non-encryption period may be assigned to MPEG data in units longer or shorter than file units or sequence units.

Figure 9:
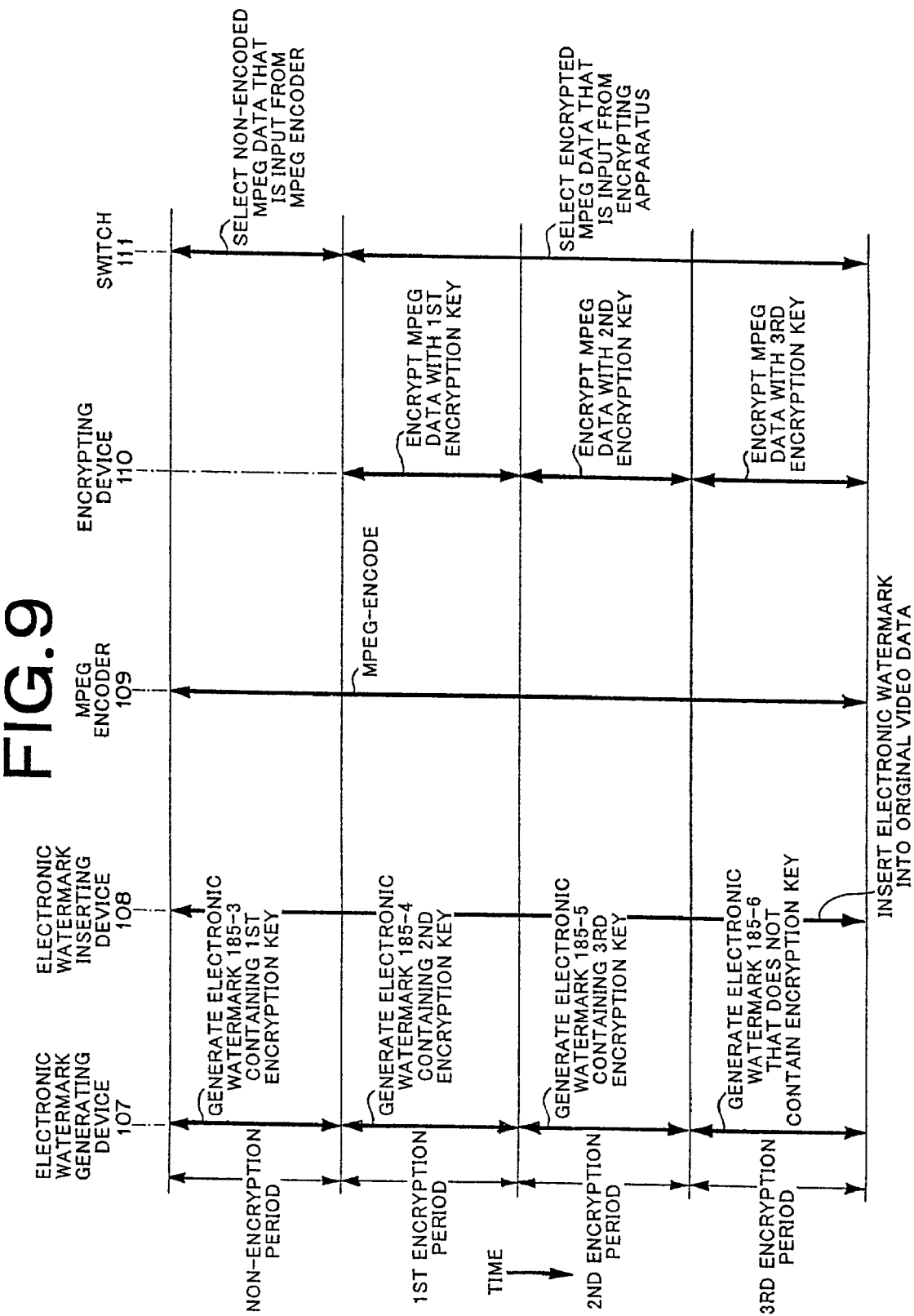
FIG. 9 is a timing chart showing the operations of the principal portions of the audio data and video data encoding apparatus according to the second embodiment of the present invention.

FIG. 9 is a timing chart showing operations of the principal portions of the audio data and video data encoding apparatus according to the second embodiment of the present invention.

Referring to FIG. 9, in the non-encryption period, the electronic watermark generating device 107 generates an electronic watermark 185-3 that contains a first encryption key. The electronic watermark inserting device 108 inserts the electronic watermark 185-3 into original picture data 181. The MPEG encoder 109 MPEG-encodes the electronic watermark inserted video data 182. The switch 111 selects non-encrypted MPEG data 183 that is input from the MPEG encoder 109. In the non-encryption period, the encrypting device 110 does not encrypt non-encrypted MPEG data 183.

In the first encryption period, the electronic watermark generating device 107 generates an electronic watermark 185-4 that contains a second encryption key. The electronic watermark inserting device 108 inserts the electronic watermark 185-4 into the original video data 181. The MPEG encoder 109 MPEG-encodes the electronic watermark inserted video data 182. The encrypting device 110 encrypts the non-encrypted MPEG data 183 with the first encryption key which the electronic watermark generating device 107 contained in the electronic watermark 185-3 in the non-encryption period. The switch 111 selects an encrypted MPEG data 186.

In the second encryption period, the electronic watermark generating device 107 generates an electronic watermark 185-5 that contains a third encryption key. The electronic watermark inserting device 108 inserts the electronic watermark 185-5 into the original video data 181. The MPEG encoder 109 MPEG-encodes the electronic watermark inserted video data 182. The encrypting device 110 encrypts the non-encrypted MPEG data 183 with the second encryption key which the electronic watermark generating device 107 contained in the electronic watermark 185-4 in the first encryption period. The switch 111 selects the encrypted MPEG data 186.

In the third encryption period, the electronic watermark generating device 107 generates an electronic watermark 185-6 that does not contain an encryption key. The electronic watermark inserting device 108 inserts the electronic watermark 185-6 into the original video data 181. The MPEG encoder 109 MPEG-encodes the electronic watermark inserted video data 182. The encrypting device 110 encrypts the non-encrypted MPEG data 183 with the third encryption key which the electronic watermark generating device 107 contained in the electronic watermark 185-5 in the second encryption period. The switch 111 selects the encrypted MPEG data 186.

Figure 10:
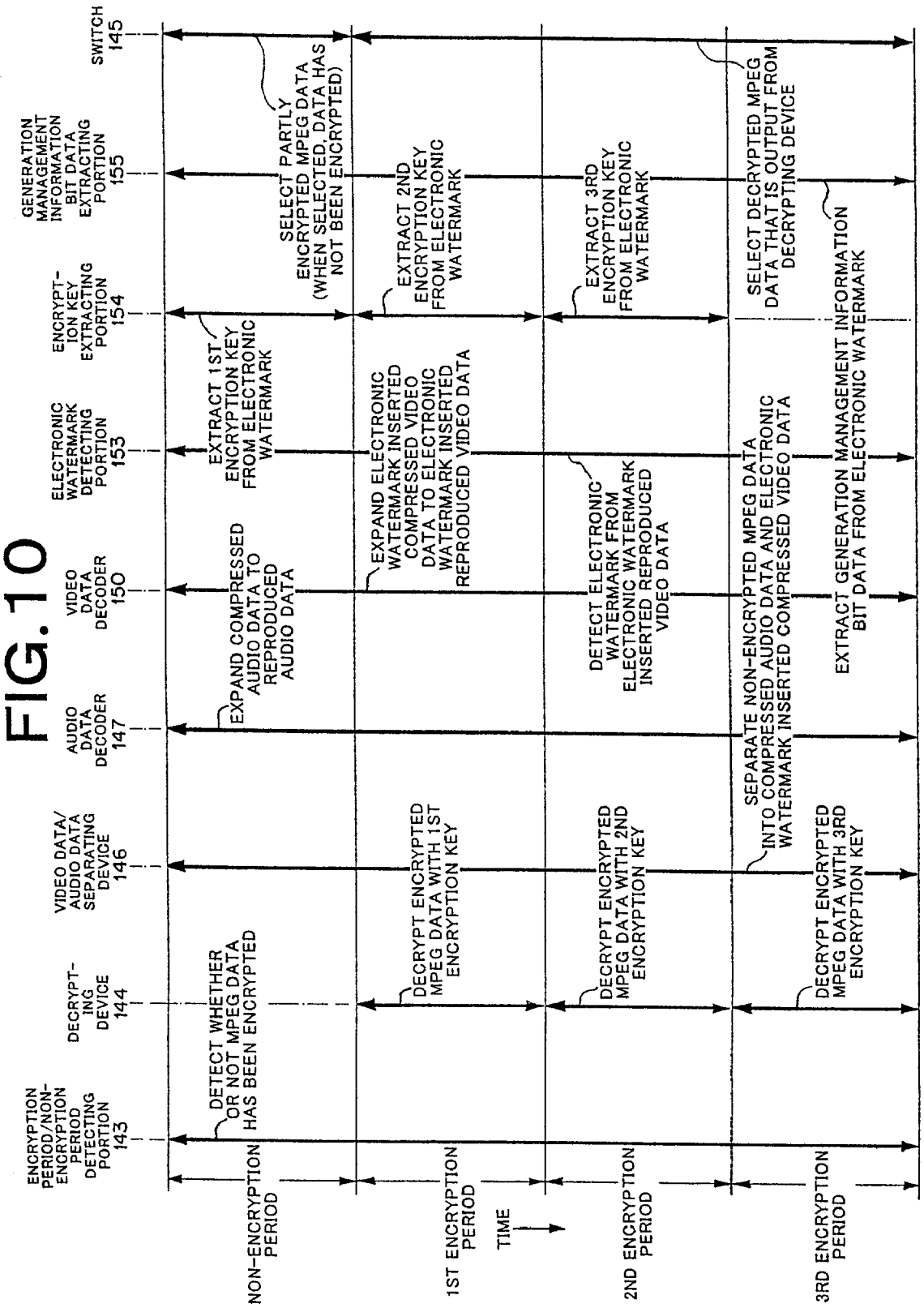
FIG. 10 is a timing chart showing operations of principal portions of an audio data and video data decoding apparatus according to the second embodiment of the present invention.

FIG. 10 is a timing chart showing operations of principal portions of an audio data and video data decoding apparatus according to the second embodiment of the present invention.

Referring to FIG. 10, in the non-encryption period, an encryption period/non-encryption period detecting portion 143 detects whether or not partly encrypted MPEG data 191 has been encrypted.

In the non-encryption period, a video data/audio data separating device 146 separates non-encrypted MPEG data 195 into compressed audio data 196 and electronic watermark inserted compressed video data 197. An audio data decoder 147 expands the compressed audio data 196 to reproduced audio data 198. A video data decoder 150 expands the electronic watermark inserted compressed video data 197 to electronic watermark inserted reproduced video data 200. An electronic watermark detecting portion 153 detects an electronic watermark 193 that contains generation management information bit data and a first encryption key from the electronic watermark inserted reproduced video data 200. An encryption key extracting portion 154 extracts the first encryption key from the electronic watermark 193. A generation management information bit data extracting portion 155 extracts the generation management information bit data 202 from the electronic watermark 193. The switch 145 selects the partly encrypted MPEG data 191, which is also input to the decrypting device 144. In the non-encryption period, the partly encrypted MPEG data 191 has not been encrypted.

In the non-encryption period, the decrypting device 144 does perform decryption.

In the first encryption period, the encryption period/non-encryption period detecting portion 143 detects whether or not the partly encrypted MPEG data 191 has been encrypted. The decrypting device 144 decrypts the partly encrypted MPEG data 191 with the first encryption key extracted from the electronic watermark 193 by the encryption key extracting portion 154 in the non-encryption period. The video data/audio data separating device 146 separates the non-encrypted MPEG data 195 into compressed audio data 196 and electronic watermark inserted compressed video data 197. The audio data decoder 147 expands the compressed audio data to reproduced audio data 198. The video data decoder 150 expands the electronic watermark inserted compressed video data 197 to electronic watermark inserted reproduced video data 200. The electronic watermark detecting portion 153 detects the electronic watermark 193 that contains generation management information bit data and the second encryption key from the electronic watermark inserted reproduced video data 200. The encryption key extracting portion 154 extracts the second encryption key 192 from the electronic watermark 193. The generation management information bit data extracting portion 155 extracts the generation management information bit data 202 from the electronic watermark 193. The switch 145 selects the non-encrypted MPEG data 194 that is output from the decrypting device 144.

In the second encryption period, the encryption period/non-encryption period detecting portion 143 detects whether or not partly encrypted MPEG data 191 has been encrypted. The decrypting device 144 decrypts the partly encrypted MPEG data 191 with the second encryption key extracted from the electronic watermark 193 by the encryption key extracting portion 154 in the first encryption period. The video data/audio data separating device 146 separates the non-encrypted MPEG data 195 into the compressed audio data 196 and the electronic watermark inserted compressed video data 197. The audio data decoder 147 expands the compressed audio data 196 to reproduced audio data 198. The video data decoder 150 expands the electronic watermark inserted compressed video data 197 to the electronic watermark inserted reproduced video data 200. The electronic watermark detecting portion 153 detects the electronic watermark 193 that contains generation management information bit data and a third encryption key from the electronic watermark inserted reproduced video data 200. The encryption key extracting portion 154 extracts the third encryption key from the electronic watermark 193. The generation management information bit data extracting portion 155 extracts the generation management information bit data 202 from the electronic watermark 193. The switch 145 selects the non-encrypted MPEG data 194 that is output from the decrypting device 144.

In the third encryption period, the encryption period/non-encryption period detecting portion 143 detects whether or not the partly encrypted MPEG data 191 has been encrypted. The decrypting device 144 decrypts the partly encrypted MPEG data 191 with the third encryption key extracted from the electronic watermark 193 by the encryption key extracting portion 154 in the second encryption period. The video data/audio data separating device 146 separates the non-encrypted MPEG data 195 into the compressed audio data 196 and the electronic watermark inserted compressed video data 197. The audio data decoder 147 expands the compressed audio data 196 to the reproduced audio data 198. The video data decoder 150 expands the electronic watermark inserted compressed video data 197 to the electronic watermark inserted reproduced video data 200. The electronic watermark detecting portion 153 detects the electronic watermark 193 that contains the generation management information bit data from the electronic watermark inserted reproduced video data 200. The generation management information bit data extracting portion 155 extracts the generation management information bit data 202 from the electronic watermark 193. The switch 145 selects the non-encrypted MPEG data 194 that is output from the decrypting device 144.

In the third encryption period, the encryption key extracting portion 154 does not extract an encryption key from the electronic watermark 193.

According to the second embodiment of the present invention, the following effects can be obtained in addition to those of the first embodiment.

Since one encryption period is divided into a plurality of encryption subperiods and MPEG data in each encryption subperiod is encrypted with an encryption key contained in an electronic watermark in another encryption period, the time necessary for decrypting MPEG data in all the encryption period is proportional to the number of divided encryption periods. Thus, an unauthorized person who does not have an electronic watermark detector is discouraged from illegally decrypting MPEG data. In addition, since it is difficult to cryptanalyze encryption keys in a short time, audio data and video data can be prevented from being successively reproduced.

(Third Embodiment)

Figure 11:
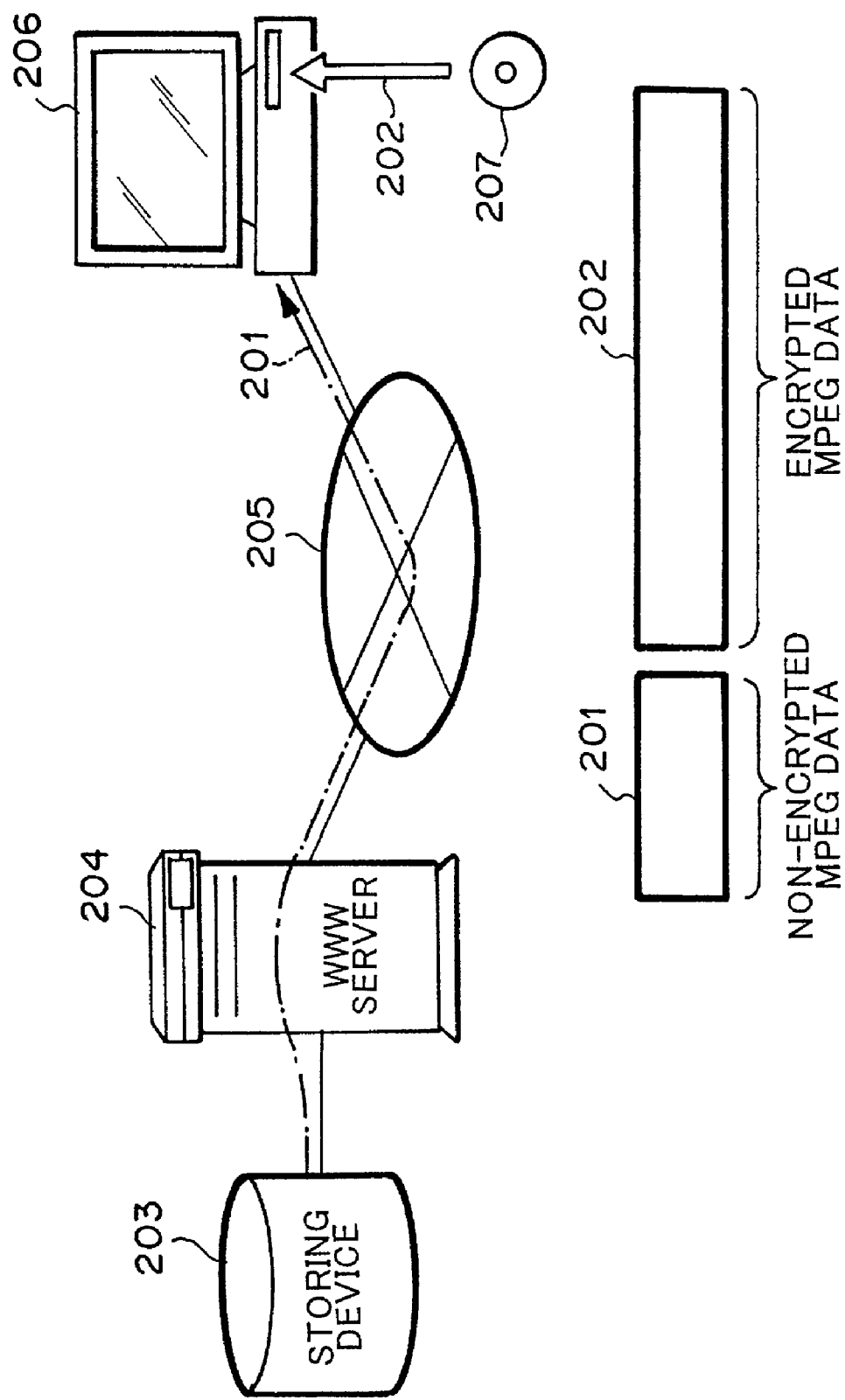
FIG. 11 is a conceptual schematic diagram for explaining a third embodiment of the present invention.

Next, with reference to FIG. 11, a third embodiment of the present invention will be described.

Non-encrypted MPEG data 201 is stored in a storing device 203. Corresponding to a request issued from a computer 206, the non-encrypted MPEG data 201 is transmitted from the storing device 203 to the computer 206 through a WWW server 204 and a network such as the Internet. The non-encrypted MPEG data 201 transmitted to the computer 206 is stored to an external storing device (not shown) thereof. When the non-encrypted MPEG data 201 is transmitted from the WWW server 204 to the computer 206, FTP (File Transfer Protocol) or the like over TCP/IP (Transmission Control Protocol/Internet Protocol) is used.

Encrypted MPEG data 202 is recorded on a portable record medium 207 such as a DVD.

The data capacity of the non-encrypted MPEG data 201 is much smaller than the data capacity of the encrypted MPEG data 202. Thus, the transmission time of the non-encrypted MPEG data 201 from the storing device 203 to the computer 206 is very shorter than that of the encrypted MPEG data. In addition, an encryption key necessary for decrypting the encrypted MPEG data 202 has been inserted as a part or all of an electronic watermark into the non-encrypted MPEG data 201. In addition, video data of the non-encrypted MPEG data is preferably a content or an advertisement of the encrypted MPEG data 202. The encrypted MPEG data 202 has been encrypted with the encryption key contained as a part or all of an electronic watermark in the non-encrypted MPEG data 201.

When a user intends to watch and/or listen to the content of the encrypted MPEG data 202, the user operates the computer 206 so as to download the non-encrypted MPEG data 201 stored in the storing device 203 to the computer 206. In addition, the user obtains the record medium 207 from the content producer through a distribution route or a retail store and loads the obtained record medium 207 to the computer 206. The audio data and video data decoding apparatus embodied by the computer 206 reproduces the non-encrypted MPEG data 201 corresponding to user's operation. At this point, the apparatus detects the electronic watermark from the non-encrypted MPEG data 201 and extracts the encryption key from the detected electronic watermark. Thereafter, the computer 206 decrypts the encrypted MPEG data 202 with the extracted encryption key and reproduces audio data and video data from the encrypted MPEG data 202.

The content producer charges for the content of the encrypted MPEG data 202 when the computer 206 downloads the non-encrypted MPEG data 201.

In the above explanation, the audio data and video data decoding apparatus is embodied by a computer. However, according to the third embodiment, the audio data and video data decoding apparatus may be a dedicated audio and video data decoding apparatus or an apparatus having both a function as the audio data and video data decoding apparatus and other functions.

In addition, in the above explanation, the encrypted MPEG data 202 has been recorded on a portable record medium such as a DVD. Alternatively, the encrypted MPEG data 202 may be broadcast. The audio data and video data decoding apparatus may receive the encrypted MPEG data 202, store it to an external storing device, and then reproduce it.

According to the third embodiment, the time for downloading a content through a network can be shortened. In addition, when an advertisement is publicized on a WWW site from which the non-encrypted MPEG data 201 is downloaded, the content producer can obtain an advertisement benefit therefrom. As a result, the content producer can reduce the price of the content.

(Other Embodiments)

According to the third embodiment, the non-encrypted MPEG data is distributed from a content provider to a consumer through a communication, while the encrypted MPEG data is distributed in the form of a package from the content provider to the consumer. Alternatively, each of the non-encrypted MPEG data and the encrypted MPEG data may be distributed from the content provider to the consumer through a communication, a package, or a broadcast.

According to the first to third embodiments, an electronic watermark is inserted into video data. Alternatively, an electronic watermark may be inserted into audio data or character data. According to the first to third embodiments, video data and audio data are encrypted. Alternatively, only video data or only audio data may be encrypted. Alternatively, character data may be encrypted. For example, while an electronic watermark that contains an encryption key is inserted into a first portion of video data, only a second portion of the video data may be encrypted. Alternatively, while an electronic watermark that contains an encryption key is inserted into a first portion of audio data, only a second portion of the audio data may be encrypted. Alternatively, while an electronic watermark that contains an encryption key is inserted into a first portion of character data, only a second portion of the character data may be encrypted. Alternatively, while an electronic watermark that contains an encryption key is inserted into a first portion of video data, a second portion of the video data, audio data, and character data may be encrypted. Alternatively, while an electronic watermark that contains an encryption key is inserted into a first portion of audio data, a second portion of the audio data, video data, and character data may be encrypted. Alternatively, while an electronic watermark that contains an encryption key is inserted into a first portion of character data, a second portion of the character data, video data, and audio data may be encrypted.

On the basis of the second embodiment, one long content may be separately recorded to a plurality of DVDs. MPEG data recorded on one DVD may be encrypted with an encryption key contained in an electronic watermark inserted into MPEG data recorded on another DVD.

The audio data and video data encoding apparatus shown in FIG. 1 and the audio data and video data decoding apparatus shown in FIG. 3 may be embodied by other than hardware. In other words, the audio data and video data encoding apparatus shown in FIG. 1 and the audio data and video data decoding apparatus shown in FIG. 3 may be embodied by a computer that executes a program that causes the computer to function as the audio data and video data encoding apparatus shown in FIG. 1 and the audio data and video data decoding apparatus shown in FIG. 3. In the case, such a program may be recorded on a record medium such as a CD-ROM. Alternatively, such a program may be downloaded from another computer through a network.

According to the first to third embodiments, an electronic watermark is inserted into non-encrypted MPEG data. The electronic watermark contains an encryption key. With the encryption key, encrypted MPEG data is decrypted. However, it is not always necessary to encrypt MPEG data. For example, MPEG data may be divided into non-concealed MPEG data and concealed MPEG data. An electronic watermark may be inserted into the non-concealed MPEG data. A revealer key necessary for revealing the concealed MPEG data may be contained in the electronic watermark. With the revealer key, the concealed MPEG data may be revealed. According to the present invention, such a concealment is included in the encryption. Likewise, such a revealer key is included in the encryption key.

According to the first to third embodiments, as an example of audio data and video data compressing system, a system for generating MPEG data was described. Of course, another system may be used. Alternatively, audio data and video data may not be compressed.

As was described above, the present invention takes the following effects.

Even if an encryption key for one content is cryptanalized, other contents cannot be decrypted with the cryptanalized encryption key. Thus, the copyright of a content producer can be properly protected. In a case where one content is divided into a plurality of portions and the first embodiment is applied to each portion, even if an encryption key for one divided portion is cryptanalized, other divided portions cannot be decrypted with the cryptanalized encryption key. Thus, the copyright of the content producer can be more properly protected.

Since an encryption key is contained in a content, it is not necessary for the user to obtain the encryption key and the content in different routes and set the obtained encryption key to the reproducing device.

Since an intact encryption key has not been inserted into MPEG data, it is difficult to extract the encryption key from the MPEG data. In particular, when the reproducing device has a structure that prevents an encryption key that is output from the encryption key extracting portion from being accessed from the outside of the device, it becomes impossible for an unauthorized person to extract the encryption key from the MPEG data.

Since the reproducing device cannot reproduce audio data and video data unless the device is provided with an electronic watermark detecting device, a pirate reproducing device that does not have the electronic watermark detecting device cannot reproduce audio data and video data.

Unless video data into which an electronic watermark containing an encryption key has been inserted is reproduced, encrypted video data cannot be decrypted. Thus, for example, if an electronic watermark containing an encryption key is inserted into a commercial, the user always watch and/or listen to the commercial before watching and/or listening to the content. Consequently, the content producer can obtain a profit from the sponsor.

Since one encryption period is divided into a plurality of encryption subperiods and MPEG data in each encryption subperiod is encrypted with an encryption key contained in an electronic watermark of another encryption period, the time necessary for decrypting MPEG data in all the encryption period is proportional to the number of divided encryption periods. Thus, an unauthorized person who does not have an electronic watermark detector is discouraged from illegally decrypting MPEG data. In addition, since it is difficult to obtain encryption keys in short time, audio data and video data can be prevented from being successively reproduced.

Although the present invention has been shown and described with respect to the best mode embodiment thereof, it should be understood by those skilled in the art that the foregoing and various other changes, omissions, and additions in the form and detail thereof may be made therein without departing from the spirit and scope of the present invention.

What is claimed is:

1. An encrypting apparatus using an encryption key contained in an electronic watermark, said apparatus comprising:

generating means for generating a first electronic watermark which contains a first encryption key;
electronic watermark inserting means for inserting said first electronic watermark containing said first encryption key into a first portion of data; and
encrypting means for encrypting a second portion of said data with said first encryption key,
wherein said electronic watermark generating means generates an n-th electronic watermark which contains an n-th encryption key; where n is an integer larger than one, said electronic watermark inserting means inserts said n-th electronic watermark into n-th portion of said data before said encrypting means encrypts said n-th portion with an (n−1)-th encryption key, and said encrypting means encrypts an (n+1)-th portion of said data with said n-th encryption key.

2. The encrypting apparatus as set forth in claim 1, further comprising: compressing means for compressing said data.

3. The encrypting apparatus as set forth in claim 2, wherein said compressing means compresses said data before said data is encrypted.

4. The encrypting apparatus as set forth in claim 1, wherein said data contain at least one of video data, audio data, and character data.

5. The encrypting apparatus as set forth in claim 1, wherein said first portion and said second portion are output to the same medium.

6. The encrypting apparatus as set forth in claim 1, wherein said second portion is output to a medium different from a medium to which said first portion is output.

7. The encrypting apparatus as set forth in claim 1, wherein said first portion contains a commercial.

8. A decrypting apparatus using an encryption key contained in an electronic watermark, said apparatus comprising:
electronic watermark detecting means for detecting an a first electronic watermark from a first portion of data;
encryption key extracting means for extracting a first encryption key from said first electronic watermark; and
decrypting means for decrypting a second portion of said data with said first encryption key,
wherein said electronic watermark detecting means detects an n-th electronic watermark from an n-th portion of said data decrypted with an (n−1)-th encryption key by said decrypting means, where n is an integer larger than one, said encryption key extracting means extracts an n-th encryption key from said n-th electronic watermark, and said decrypting means decrypts an (n+1)-th portion of said data with said n-th encryption key.

9. The decrypting apparatus as set forth in claim 8, further comprising: expanding means for expanding said data.

10. The decrypting apparatus as set forth in claim 9, wherein said expanding means expands said data after said data is decrypted.

11. The decrypting apparatus as set forth in claim 8, wherein said data contain at least one of video data, audio data, and character data.

12. The decrypting apparatus as set forth in claim 8, wherein said first portion and said second portion are input from the same medium.

13. The decrypting apparatus as set forth in claim 8, wherein said second portion is input from a medium different from a medium from which said first portion is input.

14. The decrypting apparatus as set forth in claim 8, wherein said first portion contains a commercial.

15. An encrypting method using an encryption key contained in an electronic watermark, said method comprising the steps of:
generating a first electronic watermark which contains a first encryption key;
inserting said first electronic watermark containing said first encryption key into a first portion of data;
encrypting a second portion of said data with said first encryption key;
generating an n-th electronic watermark which contains an n-th encryption key, where n is an integer larger than one;
inserting said n-th electronic watermark into an n-th portion of said data before said n-th portion is encrypted with an (n−1)-th encryption key; and
encrypting an (n+1)-th portion of said data with said n-th encryption key.

16. The encrypting method as set forth in claim 15, further comprising the step of:
compressing the data.

17. The encrypting method as set forth in claim 16, wherein said data is compressed before said data is encrypted.

18. The encrypting method as set forth in claim 15, wherein said data contain at least one of video data, audio data, and character data.

19. The encrypting method as set forth in claim 15, further comprising the steps of:
outputting said first portion to a medium; and
outputting said second portion to the same medium as the medium to which said second portion is output.

20. The encrypting method as set forth in claim 15, further comprising the steps of:
outputting said first portion to a medium; and
outputting said second portion to a medium different from the medium to which said first portion is output.

21. The encrypting method as set forth in claim 15, wherein the first portion contains a commercial.

22. A decrypting method using an encryption key contained in an electronic watermark, said method comprising the steps of:
detecting a first electronic watermark from a first portion of data;
extracting a first encryption key from said first electronic watermark;
decrypting a second portion of said data with said first encryption key;
detecting an n-th electronic watermark from an n-th portion of said data decrypted with an (n−1)-th encryption key, where n is an integer larger than one;
extracting an n-th encryption key from said n-th electronic watermark; and
decrypting an (n+1)-th portion of said data with said n-th encryption key.

23. The decrypting method as set forth in claim 22, further comprising the step of:
expanding said data.

24. The decrypting method as set forth in claim 23, wherein said data is expanded after said data is decrypted.

25. The decrypting method as set forth in claim 22, wherein said data contain at least one of video data, audio data, and character data.

26. The decrypting method as set forth in claim 22, further comprising the steps of:
inputting said first portion from a medium; and
inputting said second portion from the same medium as the medium from which said first portion is input.

27. The decrypting method as set forth in claim 22, further comprising the steps of:
  inputting said first portion from a medium; and
  inputting said second portion from a medium different from the medium from which said first portion is input.

28. The decrypting method as set forth in claim 22, wherein said first portion contains a commercial.

29. A computer program product embodied on a computer-readable medium and comprising code which, when executed, causes a computer to perform a method comprising the steps of:
  generating a first electronic watermark which contains a first encryption key;
  inserting said first electronic watermark containing said first encryption key into a first portion of data;
  encrypting a second portion of said data with said first encryption key;
  generating an n-th electronic watermark which contains an n-th encryption key, where n is an integer larger than one;
  inserting said n-th electronic watermark into an n-th portion of said data before said n-th portion is encrypted with an (n−1)-th encryption key; and
  encrypting an (n+1)-th portion of said data with said n-th encryption key.

30. The computer program product as set forth in claim 29, wherein said method further comprises the step of:
  compressing the data.

31. The computer program product as set forth in claim 30, wherein said data is compressed before said data is encrypted.

32. The computer program product as set forth in claim 29, wherein said data contain at least one of video data, audio data, and character data.

33. The computer program product as set forth in claim 29, wherein said method further comprises the steps of:
  outputting said first portion to a medium; and
  outputting said second portion to the same medium as the medium to which said second portion is output.

34. The computer program product as set forth in claim 29, wherein said method further comprises the steps of:
  outputting said first portion to a medium; and
  outputting said second portion to a medium different from the medium to which said first portion is output.

35. The computer program product as set forth in claim 29, wherein the first portion contains a commercial.

36. A computer program product embodied on a computer-readable medium and comprising code which, when executed, causes a computer to perform a method comprising the steps of:
  detecting a first electronic watermark from a first portion of data;
  extracting a first encryption key from said first electronic watermark;
  decrypting a second portion of said data with said first encryption key;
  detecting an n-th electronic watermark from an n-th portion of said data decrypted with an (n−1)-th encryption key, where n is an integer larger than one;
  extracting an n-th encryption key from said n-th electronic watermark; and
  decrypting an (n+1)-th portion of said data with said n-th encryption key.

37. The computer program product as set forth in claim 36, wherein said method further comprises the step of:
  expanding said data.

38. The computer program product as set forth in claim 37, wherein said data is expanded after said data is decrypted.

39. The computer program product as set forth in claim 36, wherein said data contain at least one of video data, audio data, and character data.

40. The computer program product as set forth in claim 36, wherein said method further comprises the steps of:
  inputting said first portion from a medium; and
  inputting said second portion from the same medium as the medium from which said first portion is input.

41. The computer program product as set forth in claim 36, wherein said method further comprises the steps of:
  inputting said first portion from a medium; and
  inputting said second portion from a medium different from the medium from which said first portion is input.

42. The computer program product as set forth in claim 36, wherein said first portion contains a commercial.

43. A computer readable medium on which data has been stored, said data comprising a data structure used for decrypting a subsequent portion of data based on a previous portion of data, said data structure comprising:
  a first portion into which a first electronic watermark which contains a first encryption key has been inserted;
  a second portion encrypted with said first encryption key;
  an n-th electronic watermark which contains an n-th encryption key has been inserted into an n-th portion, where n is an integer larger than one; said data has an (n+1)-th portion encrypted with said n-th encryption key.

* * * * *